United States Patent [19]

Sakao

[11] Patent Number: 4,941,639
[45] Date of Patent: Jul. 17, 1990

[54] REMOTELY CONTROLLED REARVIEW MIRROR FOR MOTOR VEHICLES

[75] Inventor: Masahito Sakao, Saitama, Japan
[73] Assignee: Kabushiki Kaisha Matsuyama Seisakusho, Tokyo, Japan
[21] Appl. No.: 190,176
[22] Filed: May 4, 1988
[30] Foreign Application Priority Data
  May 7, 1987 [JP] Japan ................. 62-111136
[51] Int. Cl.⁵ .......................................... G02B 7/18
[52] U.S. Cl. .................... 248/549; 248/484; 350/635
[58] Field of Search ............ 248/549, 466, 468, 475.1, 248/476, 479, 481, 482, 483, 484, 485, 486, 487, 900; 350/631, 632, 635, 636, 640

[56] References Cited

U.S. PATENT DOCUMENTS

| 3,782,218 | 1/1974 | Gmeiner et al. ........... | 74/491 |
| 4,464,017 | 8/1984 | Wada .................... | 350/635 |
| 4,548,483 | 10/1985 | Moro .................... | 248/900 |

FOREIGN PATENT DOCUMENTS

| 2432707 | 1/1976 | Fed. Rep. of Germany ...... | 248/900 |
| 2436339 | 2/1976 | Fed. Rep. of Germany . | |
| 2628873 | 1/1978 | Fed. Rep. of Germany ...... | 350/635 |
| 3605945 | 8/1987 | Fed. Rep. of Germany . | |
| 7734 | 1/1982 | Japan . | |
| 1551 | 1/1986 | Japan . | |
| 12453 | 1/1986 | Japan .................... | 350/631 |

Primary Examiner—Ramon O. Ramirez
Assistant Examiner—Robert A. Olson
Attorney, Agent, or Firm—Rosen, Dainow and Jacobs

[57] ABSTRACT

An automotive remotely controlled rearview mirror assembly is remotely controlled from within an automobile for adjusting the angle of the reflecting surface of the rearview mirror to obtain a desired rear sight. The remotely controlled rearview mirror assembly comprises a housing adapted to be mounted on the automobile body by a mount, a mirror swingably supported in the housing, a control lever swingably mounted on the mount for remotely controlling the mirror for a desired angle thereof from within the automobile, and a link mechanism operatively interconnecting the mirror and the control lever and angularly movable vertically and laterally in response to swinging movement of the control lever. The link mechanism is angularly movable vertically about an axis which is inclined upwardly in a lateral direction away from a nominal vertical plane, and also angularly movable laterally about an axis which lies in a plane including a line substantially normal to a nominal horizontal plane.

7 Claims, 5 Drawing Sheets

REMOTELY CONTROLLED REARVIEW MIRROR FOR MOTOR VEHICLES

BACKGROUND OF THE INVENTION

1. Field of the Invention:

The present invention relates to an automotive rearview mirror assembly which is adopted to be mounted on the outer panel of an automobile door and can be remotely controlled by a person inside an automobile for adjusting the angle of the reflecting surface of the rearview mirror to obtain a desired rear sight or view.

2. Description of the Relevant Art:

Rearview mirror assemblies mounted on the outer panels of side doors of an automobile are inclined rearwardly and inwardly with respect to a transverse axis of the automobile which extends perpendicularly to a longitudinal axis of the automobile body, so that the driver, in particular, inside the automobile can have a good rearview range. One known rearview mirror assembly for use on an automobile door is disclosed in U.S. Pat. No. 3,782,218 entitled "Adjustable and tiltable rearview mirror assembly for passenger motor vehicles". The disclosed rearview mirror assembly comprises a housing hinged to a door, a mirror swingably supported in the housing, and a control lever operatively coupled to the mirror through a link mechanism and swingable by a ball-and-socket joint. By pivotally turning the control lever, the mirror is angularly moved dependent on the turning motion of the control lever by the link mechanism.

The mirror assembly includes an axis about which the mirror is vertically turned, the axis being disposed on a line (on which the link mechanism is positioned) interconnecting the point where the control lever is swingably supported and the point where the mirror is swingably supported. If the axis were a horizontal axis parallel to ground, then since the housing as it is mounted on the door or vehicle body is inclined rearwardly and inwardly, when the mirror is turned downwardly, the sight appearing on the mirror would be shifted to the left, approaching the automobile body. According to the above U.S. Patent, this problem is solved by tilting the axis upwardly. However, the axis is also inclined inwardly because a mirror holder has a lateral axis of rotation normal to a fore-and-aft axis of rotation thereof. As a result, when the mirror is tilted upwardly and then turned to the right, i.e., in a direction away from the automobile body, the rear sight on the mirror is displaced upwardly. Therefore, the control lever has to be turned several times until the driver gets an appropriate rear sight. This process is tedious and time-consuming.

SUMMARY OF THE INVENTION

It is an object of the present invention to provide a remotely controlled rearview mirror assembly for use on an automobile, which can appropriately and easily be adjusted for a desired mirror angle.

According to the present invention, there is provided a remotely controlled rearview mirror assembly for use on an automobile having an automobile body, comprising a housing adapted to be mounted on the automobile body by a mount, a mirror swingably supported in the housing, a control lever swingably mounted on the mount for remotely controlling the mirror for a desired angle thereof from within the automobile, and a link mechanism operatively interconnecting the mirror and the control lever and angularly movable vertically and laterally in response to swinging movement of the control lever, the link mechanism being angularly movable vertically about an axis which is inclined upwardly in a lateral direction away from a nominal vertical plane, and also angularly movable laterally about an axis which lies in a plane including a line substantially normal to a nominal horizontal plane.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
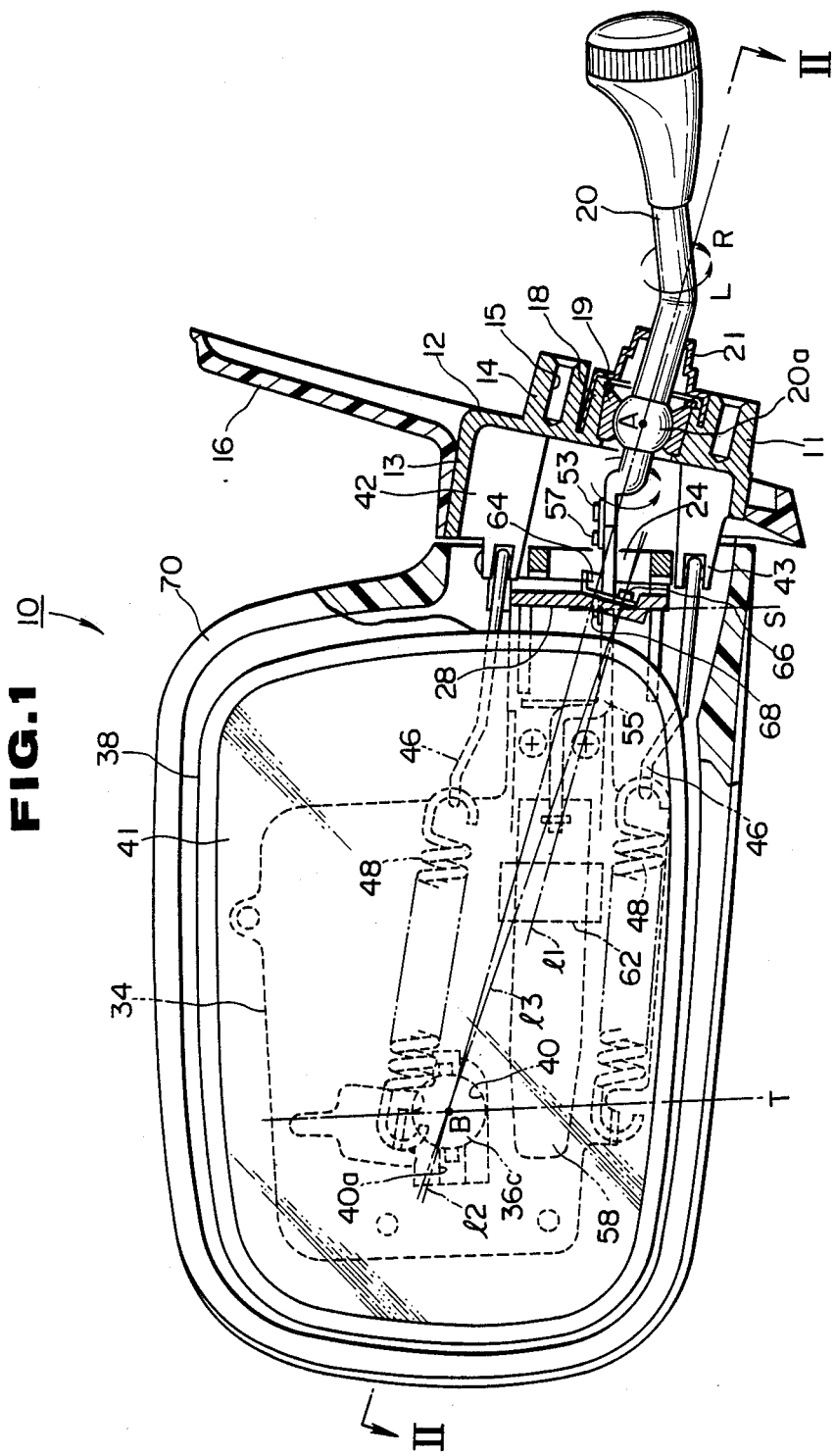
FIG. 1 is a front elevational view, partly in cross section, of a remotely controlled rearview mirror assembly according to the present invention.
Figure 2:
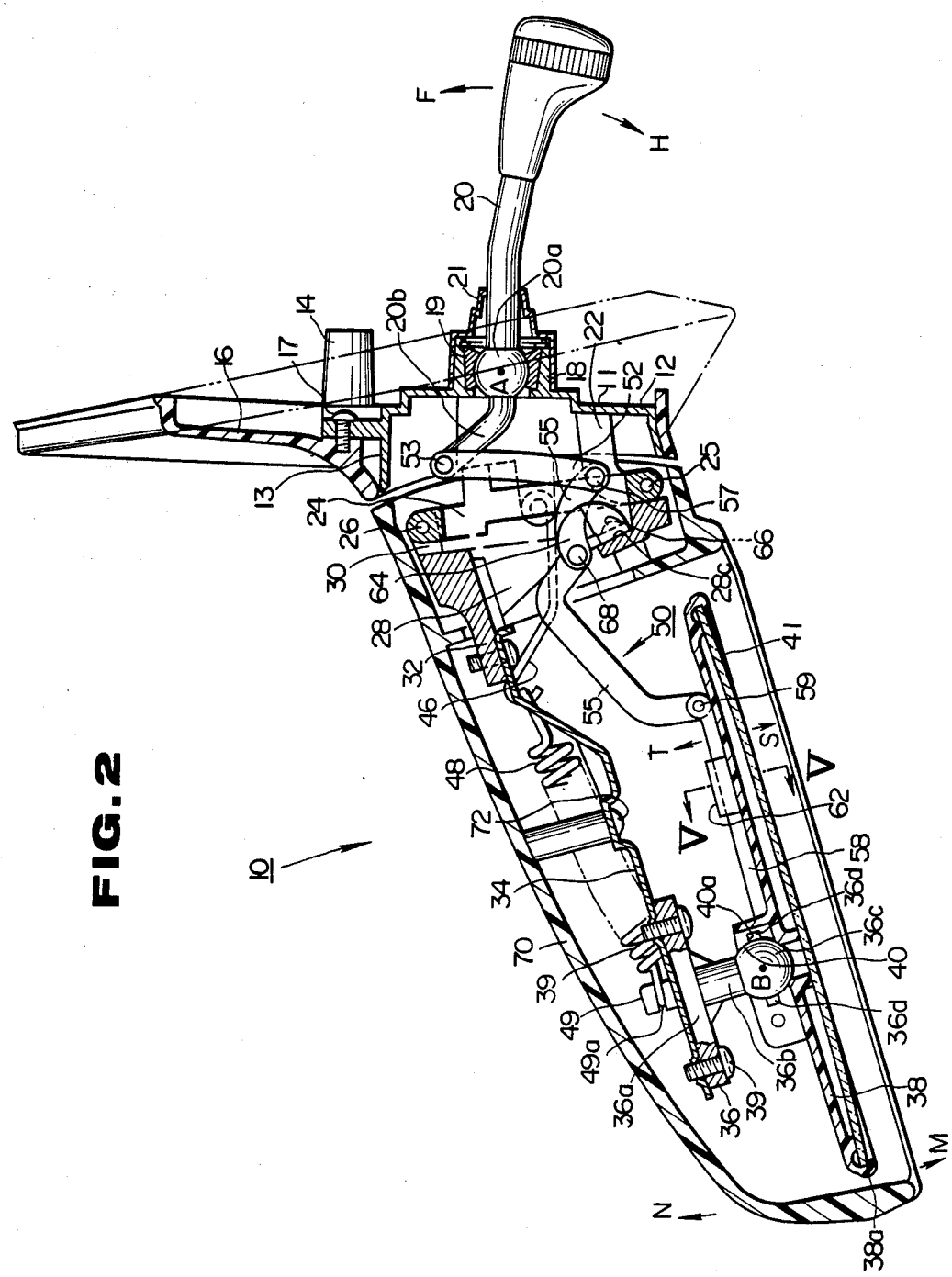
FIG. 2 is a cross-sectional view taken along line II—II of FIG. 1.

As shown in FIGS. 1 and 2, a remotely controlled rearview mirror assembly 10 for use on an automobile according to the present invention has a mount 11 of metal comprising a bottom wall 12 and four side walls 13. The bottom wall 12 has a plurality of bosses 14 projecting from the lower surface thereof and having respective screw holes 15 through which screws (not shown) are threaded from inside of the automobile to fix the mount 11 to an automobile body such as a door. The mount 11 is covered with a cover 16 of synthetic resin which is fastened to the mount 11 by means of a screw 17 to conceal the side walls 13 and their neighboring portions. The mount 11 also has a larger-diameter boss 18 projecting from the lower surface thereof adjacent to the bosses 14. A socket 19 is inserted in the boss 18, and a ball 20a integral with a control lever 20 is pivotally fitted in the socket 19. A boot 21 disposed over the control lever 20 is fitted over the end of the boss 18. The ball 20a and the socket 19 jointly serve as a ball-and-socket joint which allows the control lever 20 to be angularly moved about a point A at the center of the ball 20a. The rearview mirror assembly 10 is shown as a lefthand rearview mirror assembly to be mounted on a lefthand door. It can easily be understood that a righthand rearview mirror assembly to be mounted on a righthand door is structurally the mirror image of the lefthand rearview mirror assembly.

Figure 3:
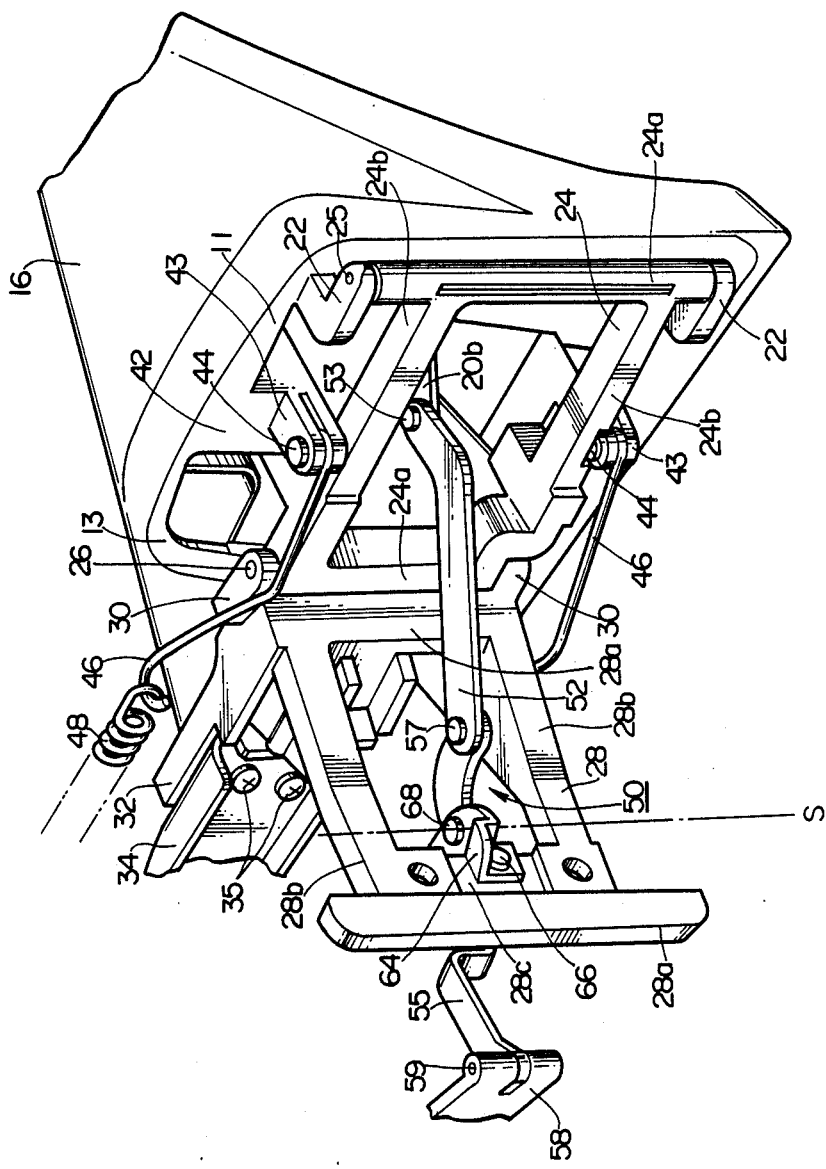
FIG. 3 is a fragmentary perspective view of the rearview mirror assembly shown in FIG. 1, the rearview mirror assembly being shown as tilted forwardly for a better understanding of a link mechanism therein.

As shown in FIG. 3, one (rear side wall as mounted on the automobile) of the side walls 13 of the mount 11 has a pair of substantially L-shaped brackets 22 projecting therefrom and spaced from each other. A first swing frame 24 is swingably mounted on a pin 25 extending between and mounted on the brackets 22. The first swing frame 24 is made of metal and has a substantially rectangular outer profile. The first swing frame 24 comprises two vertical frame members 24a and two horizontal frame members 24b extending between and jointed to the ends of the vertical frame members 24a. The pin 25 extends longitudinally through one of the vertical frame members 24a. The other vertical frame member 24a has a longitudinally through hole in which a pin 26 is inserted. A second swing frame 28 is swingably supported on the pin 26. The second swing frame 28 is made of metal and has a substantially rectangular outer profile. The second swing frame 28 comprises two vertical frame members 28a and two horizontal frame members 28b extending between and joined to the ends of the vertical frame members 28a. One of the vertical frame members 28a has a pair of smaller brackets 30 integral with the opposite ends thereof, the ends of the pin 26 being fixed respectively to the smaller brackets 30. The same vertical frame member 28a has a larger bracket 32 integral therewith remotely from the smaller brackets 30 and to which a substantially rectangular support plate 34 of metal is fixed by means of two screws 35.

A support member 36 is installed on one surface of the support plate 34. A mirror holder 38 of synthetic resin is angularly movably supported on the support member 36. The support member 36 comprises a thin base plate 36a fixed to the support plate 34 by means of two screws 39, a cylindrical post 36b erected on the base plate 36a, and a ball 36c mounted on the distal end of the post 36b and having two pins 36d projecting in diametrically opposite directions. The mirror holder 38 has a spherical recess or socket 40 defined in the back thereof, the ball 36c being fitted in the socket 40. The pins 36d are disposed in a groove 40a extending across the spherical socket 40. The socket 40 and the ball 36c jointly serve as a ball-and-socket joint for allowing the mirror holder 38 to swing omnidirectionally about a point B at the center of the ball 36c. The pins 36d and the groove 40a serve as a stop for preventing the mirror holder 38 from swinging beyond certain limits. The mirror holder 38 has a peripheral wall 38a projecting on its front surface and extending around the peripheral edge thereof. The peripheral wall 38a has a distal edge slightly curved inwardly. A mirror 41 is fitted against the peripheral wall 38a.

The mount 11 has upper and lower bosses 42 positioned substantially centrally therein. The bosses 42 have bifurcated brackets 43, respectively, projecting therefrom. Pins 44 pass through the branches of the brackets 43, respectively, and engage ends of hooks 46, respectively. The other ends of the hooks 46 retain ends of springs 48, respectively. The support plate 34 has a spring retainer 49 (FIG. 2) projecting from the back thereof and having a recess 49a in which the other end of the spring 48 engages. The spring 48 normally urges the first and second swing frames 24, 28 to be pressed in overlapping relation against the mount 11.

Figure 4:
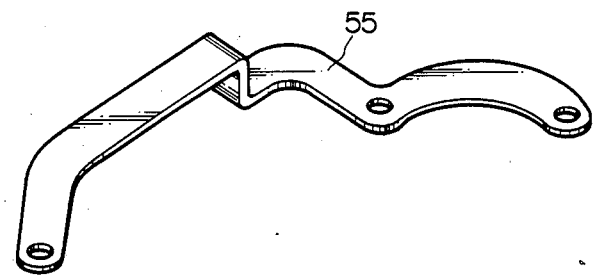
FIG. 4 is an enlarged perspective view of a second link of the link mechanism shown in FIG. 3.
Figure 5:
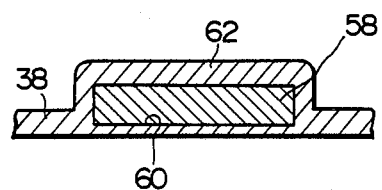
FIG. 5 is an enlarged cross-sectional view taken along line V—V of FIG. 2.

A link mechanism, generally denoted as 50, is operatively coupled between a slender support member 20b extending from the ball 20a remotely from the control lever 20 and the mirror holder 38. The link mechanism 50 includes a first link 52 swingably coupled to the distal end of the support member 20b by means of a pin 53 and a second link 55 swingably coupled to the first link 52 by means of a pin 57. As shown in FIG. 4, the second link 55 has a substantially W-shaped portion extending from the end thereof coupled to the first link 52 to an intermediate area, a short vertical portion extending from the intermediate area, and a horizontal portion extending from the vertical portion. A slider 58 is pivotally connected to the distal end of the horizontal portion of the second link 55 by means of a pin 59. The slider 58 is retained by a retainer 62 (see FIG. 5) mounted on the back of the mirror holder 38 for sliding movement along a guide slot 60 defined in the back of the mirror holder 38.

Figure 6:
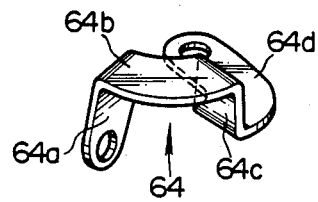
FIG. 6 is an enlarged perspective view of a link holder.

The other vertical frame member 28a remote from the brackets 30, 32 has a slanted surface 28c on its inner side. A link holder 64 has one end attached to the slanted surface 28c by means of a pin 66. The second link 55 is held on the other end of the link holder 64 by means of a pin 68. The second link 55 is thus angularly movable about the pin 66 or 68 in response to swinging movement of the control lever 20. As illustrated in FIG. 6, the link holder 64 comprises a slanted portion 64a, a first horizontal sectorial portion 64b extending contiguously from the slanted portion 64a, a vertical portion 64c depending contiguously from the horizontal portion 64b, and a second horizontal portion 64d extending contiguously from the vertical portion 64c.

Figure 7:
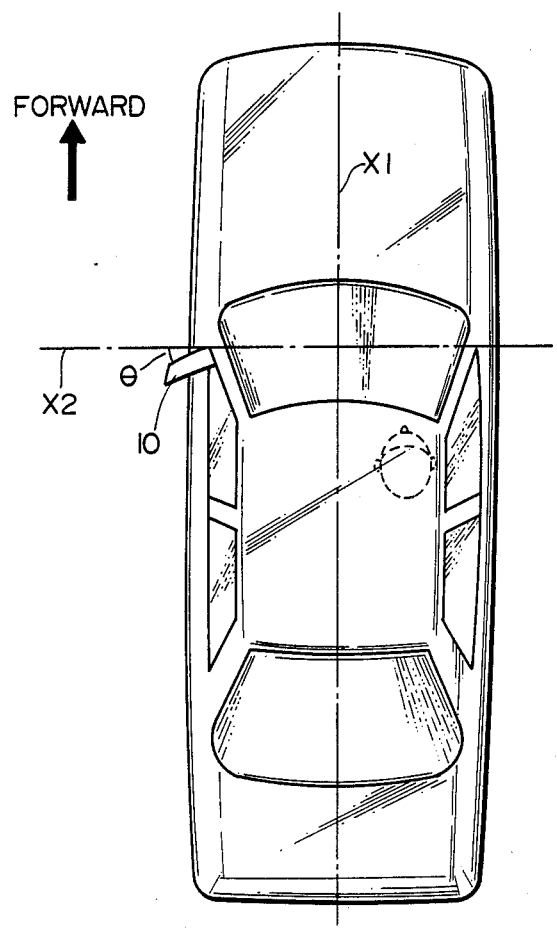
FIG. 7 is a plan view of an automobile with a lefthand rearview mirror assembly of the invention mounted on the lefthand automobile door.

As shown in FIG. 1, the mirror 41 is vertically swingable about an axis $l_1$ aligned with the axis of the pin 66, the axis $l_1$ being inclined upwardly in the outward direction. As shown in FIG. 7, in order to give the driver of the automobile a rear sight through the rearview mirror assembly 10, the rearview mirror assembly 10 is inclined at an angle $\theta$ rearwardly with respect to a transverse axis X2 normal to a longitudinal axis X1 of the automobile body. Therefore, if the mirror 41 were turned downwardly, for example, about a horizontal axis parallel to ground, the rear view appearing on the mirror 41 would be shifted toward the automobile body. According to the present invention, the axis about which the mirror 41 is vertically swingable is tilted upwardly in the outward direction, so that even when the mirror 41 is turned vertically, the rear sight appearing on the mirror 41 will not be displaced laterally. The mirror 41 may be vertically moved about an axis $l_1$ (FIG. 1) interconnecting the points A, B. In the illustrated embodiment, the slanted surface 28c and the slanted portion 64a of the link holder 64 lie perpendicularly to the line $l_1$ so that the axis of the pin 66 directed perpendicularly to the slanted portion 64a and the slanted surface 28c is tilted upwardly in the outward direction. The pin 68 about which the second link 55 is angularly movable has its axis positioned in a plane including a line substantially perpendicular to ground for the reason described later on.

Operation of the rearview mirror assembly will be described below. When a mirror housing 70 of synthetic resin fixed to the support plate 34 by a bolt 72 is turned counterclockwise (FIG. 2) in the direction of the arrow M, the mirror housing 70 can be swung about the pin 25 to a position near the side of the door with the first and second swing frames 24, 28 overlapping each other. Conversely, when the housing 70 is turned clockwise (FIG. 2) in the direction of the arrow N, the mirror housing 70 can be swung about 90 degrees (see FIG. 3) while the second swing frame 28 is angularly moved about the pin 26 away from the first swing frame 24 which remains at rest. The mirror housing 70 is thus angularly movable in opposite directions because if the rearview mirror assembly 10 is hit by a bicycle, for example, the rearview mirror assembly 10 is resiliently displaced while absorbing the impact and can be protected from damage.

When the control lever 20 is turned clockwise (in the direction of the arrow R in FIG. 1) as viewed from the driver from the position of FIG. 2, the link mechanism 50 is also turned clockwise about the pin 66. The slider 58 is also turned in the same direction, causing the mirror holder 38 and the mirror 41 to rotate so as to be tilted upwardly. At this time, since the axis l3 of rotation of the mirror 41 is inclined upwardly with respect to a horizontal axis parallel to ground, the rear view appearing on the mirror 41 is not shifted or displaced laterally. Conversely, when the control lever 20 is turned counterclockwise (in the direction of the arrow L in FIG. 1), the link mechanism 50 is also turned counterclockwise about the pin 66. The slider 58 is also turned in the same direction, causing the mirror holder 38 and the mirror 41 to rotate so as to be tilted downwardly. For the reason described above, the rear view appearing on the mirror 41 is not shifted or displaced laterally.

Now, the control lever 20 is swung about the point A rearwardly (in the direction of the arrow H in FIG. 2) from the position of FIG. 2. The support member 20b is then caused to turn about the point A forwardly in the opposite direction to the arrow H. Such swinging movement of the support member 20b moves the first link 52 forwardly. Then, the rear end of the first link 52 pulls the inner end of the second link 55 forwardly, which is turned counterclockwise about the pin 68. The counterclockwise angular movement of the second link 55 forces the inner end of the slider 58 to be displaced backwards in the direction of the arrow S (FIG. 2). As a result, the slider 58 slides along the guide slot 60 toward the automobile body. When the slider 58 is thus moved, the inner side of the mirror holder 38 is angularly moved backwards about the point B. At this time, since the axis of rotation of the mirror holder 38 and the mirror 41 lies in a vertical plane T (indicated as a line in FIG. 1 since FIG. 1 is a front elevational view) parallel to a vertical plane S (also indicated as a line), the rear view on the mirror 41 is not vertically displaced with the angular movement of the mirror holder 38.

Conversely, when the control lever 20 is swung about the point A forwardly (in the direction of the arrow F in FIG. 2) from the position of FIG. 2, the support member 20b is then caused to turn about the point A rearwardly in the opposite direction to the arrow H. Such swinging movement of the support member 20b moves the first link 52 rearwardly. Then, the rear end of the first link 52 pushes the inner end of the second link 55 rearwardly, which is turned clockwise about the pin 68. Upon the clockwise angular movement of the second link 55, the inner end of the slider 58 is forcibly displaced forwardly in the direction of the arrow T (FIG. 2), whereupon the slider 58 slides along the guide slot 60 away from the automobile body. As a consequence, the mirror holder 38 is angularly moved about the point B back to the position shown in FIG. 2. At this time, too, since the axis of rotation of the the mirror 41 lies in the vertical plane T, the rear view on the mirror 41 is not vertically displaced.

The mirror holder 38 and the support plate 34 may be dispensed with by providing a socket on the inner surface of the mirror housing 70 and supporting the mirror 41 swingably on the mirror housing 70 with a ball fitted in the socket.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A remotely controlled rearview mirror assembly for use on an automobile which has a longitudinal axis, which axis in nominally horizontal when the automobile is in a nominally horizontal state, comprising:

a mount securable on said automobile in a given orientation relative to nominal vertical and horizontal planes containing said longitudinal axis;

a housing adapted to be secured on said mount;

a mirror swingably supported in said housing;

a control lever swingably secured on said mount for remotely controlling said mirror to move to desired angular positions thereof from within the automobile; and a link mechanism operatively interconnecting said mirror and said control lever and angularly movable vertically and laterally in response to angular and rotational movement of said control lever for moving said mirror to said desired angular position, when said mount is secured in said given orientation, said link mechanism being angularly movable vertically about an axis which is inclined upwardly in a lateral direction away from a nominal vertical plane containing said longitudinal axis, and also angularly movable laterally about an axis which lies in a plane including a line substantially normal to said nominal horizontal plane containing said longitudinal axis whereby, when the mirror is moved to change the angle of the mirror relative to a vertical plane, the rear sight appearing on said mirror is not displaced laterally.

2. Apparatus according to claim 1 wherein said control lever has a first end, and said link mechanism comprises:

a first link having near and remote ends, its near end being pivotably coupled to said control lever;

a link holder pivotally secured to said housing; and a second link having near and remote ends and a central part, the central part being pivotally mounted to said link holder, its near end pivotally coupled to said remote end of the first link and its remote end coupled to the mirror said link holder being secured to the central part of said second link by a pivot having a pivot axis that is oblique to a plane normal to the pivot axis about which the link holder is secured to said housing.

3. Apparatus according to claim 2 wherein said mirror is movably secured to said housing by a first ball-and-socket coupling, said mirror thus being movable about the center point of said coupling, and wherein said control lever is movably secured to said mount by a second ball-and-socket coupling, said control lever thus being movable about the center point of said second coupling when driven by said control lever so that a line between the centers of said ball and socket couplings is oblique to a plane normal to the axis of vertical motion of said link mechanism.

4. Apparatus according to claim 3 wherein a plane normal to the axis about which said link holder is pivotable is oblique to said axis of vertical motion which extends to said center point of said first ball-and-socket coupling from said pivot securing said link holder to said housing, said mirror being pivotable about this axis of vertical motion.

5. A remotely controlled rearview mirror assembly for use on an automobile having an automobile body which has a longitudinal axis, which axis is nominally horizontal when the automobile is in a nominally horizontal state, comprising:

a mount adapted to be fixed to the automobile body in a given orientation relative to nominal vertical and horizontal planes containing said longitudinal axis;

hinge means pivotally mounted on said mount and including a support plate;

a mirror holder swingably supported on said support plate;

a mirror mounted on a front surface of said mirror holder;

a control lever swingably mounted on said mount for remotely controlling said mirror to move to desired angular positions; and a link mechanism operatively interconnecting said control lever and said mirror holder and angularly movable vertically and laterally in response to angular and rotational movement of said control lever for moving said mirror to said desired angular positions when the mount is fixed in said given orientation, said link mechanism being angularly movable vertically about an axis which is included and extends upwardly in a lateral direction away from said nominal vertical plane containing said longitudinal axis, and also angularly movable laterally about an axis which lies in a plane including a line substantially normal to said nominal horizontal plane containing said longitudinal axis whereby, when the mirror is moved to change the angle of the mirror relative to a vertical plane, the rear sight appearing on said mirror is not displaced laterally.

6. A remotely controlled rearview mirror assembly according to claim 5, wherein said hinge means comprises a first swing frame swingably attached to said mount and a second swing frame swingably attached to said first swing frame, said support plate being fixedly mounted on said second swing frame, further including a spring acting between said support plate and said mount, said spring urging said swing frames to a nominal position where they are in mutually overlying relationship and said mirror holder extends outward from said automobile body, said spring allowing said mirror holder and second swing frame to swing forwardly and rearwardly relative to said mount.

7. A remotely controlled rearview mirror assembly for use on an automobile which has a longitudinal axis, which axis is nominally horizontal when the automobile is in a nominally horizontal state, comprising:

a mount securable on said automobile in a given orientation relative to nominal vertical and horizontal planes containing said longitudinal axis;

a housing adapted to be secured on said mount;

a mirror swingably supported in said housing;

a control means mounted on said vehicle for remotely controlling said mirror to move to desired angular positions thereof from within said vehicle; and a link mechanism operatively interconnecting said mirror and said control means and angularly movable vertically and laterally in response to angular and rotational movement of said control means for moving said mirror to said desired angular positions, when said mount is secured in said given orientation, said link mechanism being angularly movable vertically about an axis which is inclined upwardly and extends in a lateral direction away from said nominal vertical plane containing said longitudinal axis, and also angularly movable laterally about an axis which lies in a plane including a line substantially normal to said nominal horizontal plane containing said longitudinal axis whereby, when the mirror is moved to change the angle of the mirror relative to a vertical plane, the rear sight appearing on said mirror is not displaced laterally.

* * * * *